Patented Sept. 13, 1927.

1,642,653

UNITED STATES PATENT OFFICE.

ALFRED D. GOLDSTEIN, OF NEW YORK, N. Y.

SOLUBLE STRIP FOR LOCAL MEDICATION OF THE ORAL CAVITY.

No Drawing. Application filed February 19, 1926. Serial No. 89,495.

The present invention is concerned with the provision of a medication for locally treating the oral cavity to relieve acid mouth, or to treat diseases of the gums.

Preferably the medication is in the nature of a slowly soluble strip of material adapted to be retained between the cheek or lips and the gums and which will insure the continuous and uniform treatment of the mouth or gums over a prolonged period of time, this period being regulated only by the solubility of the material and by the relative thickness of the strip.

The invention finds its preferred embodiment in a medication for transforming an acid mouth into an alkaline, and the device of the present invention preferably includes a slowly soluble gelatinous carrier strip in which is dissolved a soluble salt, such for instance as bicarbonate of soda, magnesia, or other alkali or alkaline compound commonly used for relieving an acid condition of the mouth.

The gelatinous carrier is preferably formed principally of agar and gelatin boiled down to the proper consistency. Either in addition to the salt, or as a substitute therefor, other soluble medicaments for the treatment of the gums may be used. For the treatment of pyorrhea, oil of cade may be used, or mercurichrome. This latter substance has also a recognized value for treating Vincent's angina and trench mouth.

In addition to the medicaments in the gelatinous carrier, there may be provided suitable flavoring ingredients and suitable astringents and rubefacients.

The method of producing the article of the present invention is subject of course to a wide variety of variations, but I shall now outline briefly one satisfactory method. A suitable quantity of agar in flake form is mixed with a small quantity of distilled water and the same is boiled down until it reaches the proper thick gelatinous consistency. At this time the magnesia, bicarbonate of soda or other alkali is added, and the boiling is continued until the salt is thoroughly dissolved, and permeates the entire body of the gelatinous mixture.

Just before the mixture is strained to remove the fragments of agar, I add a small amount of glycerine, a flavoring extract and such astringents, rubefacients and other medicaments as may be desired, depending of course upon the particular purpose for which the completed article is intended to be used.

Various flavoring material might be utilized, but I have found that cinnamon, clove, anise seed, peppermint or vanilla, either singly or in combination, and used in very small quantities, will adequately serve the purpose. As astringents, I preferably add zinc chloride. Menthol acts as one effective rubefacient, although other substances might be substituted. As above suggested other medicaments commonly used for the treatment of gums, such as oil of cade, or mercurichrome are also added at this time prior to the straining of the gelatinous mass. It will be apparent that the particular proportions of the medicaments used will depend entirely upon the purpose for which they are intended, and are subject to a wide range of variation. The amount of flavoring extract is always small.

As indicative of one embodiment of the invention, I may mention the following formula used in the preparation of a strip for treating acid mouth;

Agar, ½ oz.; water, 3 ozs., glycerine, 30 min.; oil of cinnamon, 15 min.; vanilla extract, ½ oz.; soda bicarb., ¼ oz.

The above ingredients are measured by weight and are designed for making up a small lot of the strips. The ingredients may be used in the same proportions for making large batches of the strips.

The next step of the method consists in straining the liquid or semi-liquid gelatinous mass through a thin piece of gauze or equivalent strainer into a shallow pan, where it cools and hardens. The relatively thin sheet of solidified gelatin in the bottom of the pan is then cut into strips and the strips further subdivided into proper lengths. The strip form is the preferred one because it is the most convenient to hold between the cheek or lip and the gums, and in the case of local treatment of a trench mouth condition for instance, will distribute the treatment over a wider local area for a much longer period, than would a lozenge or pellet.

The principal reason for the use of agar as part of the carrying agent, is the fact that this gelatin will dissolve very slowly, and that a strip of such gelatin carrying the medicaments may be held in the mouth for hours, or if desired for days, before complete dissolution occurs. Thus the treatment is prolonged over a considerable period of time, depending upon the thickness of the strip and the density of the mass, and the treatment will be uniform over the whole period of time during which the gelatin is dissolved. In other words, the medicaments are gradually released as the gelatin dissolves, and due to this fact, the treatment is uniform, and under control at a fixed predetermined strength.

By a prolonged period of time, I mean several hours. The strips when retained in the patient's mouth over night are found to be still effective in the morning, and still giving off treatment. As a matter of fact the strip may be held in the mouth for a period of from 4 to 6 hours without any appreciable or even noticeable diminution in the size of the carrier strip. The claims in this application are to be read with the above definition of a prolonged period in mind.

In order to cause the strip to adhere to the cheek and gums without slipping, I may paint the ends of the completed strip with some soluble adhesive material, such for instance as gum arabic.

Various changes might be made in the particular materials used, or in the particular shape of the completed article, therefore I do not wish to limit myself to the details set forth, but shall consider myself at liberty to make such changes and alterations as fairly fall within the spirit and scope of the appended claims.

I claim:

1. As a new article of manufacture, a plaster for effecting prolonged treatment of the mouth including a gelatinous carrier strip adapted to adhere to the gums, and a dissolved medicament uniformly permeating the strip.

2. As a new article of manufacture, a medicinal plaster for effecting prolonged treatment of the oral cavity including a flat flexible adhesive gelatinous carrier strip adapted to be laid against the labial or buccal surfaces of the gums, and a dissolved medicament uniformly permeating the strip, said strip being sufficiently thin to prevent distortion of the lips or cheeks of a user.

ALFRED D. GOLDSTEIN.